United States Patent
Chen et al.

(10) Patent No.: US 12,515,529 B1
(45) Date of Patent: Jan. 6, 2026

(54) COORDINATED CONTROL METHOD FOR REGENERATIVE BRAKING SYSTEM AND ANTI-LOCK BRAKING SYSTEM OF NEW ENERGY VEHICLE

(71) Applicant: Guangxi University, Nanning (CN)

(72) Inventors: Yong Chen, Nanning (CN); Qinxin Luo, Yulin (CN); Baitan Ma, Liuzhou (CN); Tiancheng Ouyang, Nanning (CN)

(73) Assignee: Guangxi University, Nanning (CN)

( * ) Notice: Subject to any disclaimer, the term of this patent is extended or adjusted under 35 U.S.C. 154(b) by 51 days.

(21) Appl. No.: 19/169,299

(22) Filed: Apr. 3, 2025

(30) Foreign Application Priority Data

Jul. 23, 2024 (CN) .......................... 202410989477.0

(51) Int. Cl.
*B60L 7/26* (2006.01)
*B60L 3/10* (2006.01)

(52) U.S. Cl.
CPC ................ *B60L 7/26* (2013.01); *B60L 3/108* (2013.01); *B60L 2240/10* (2013.01); *B60L 2240/16* (2013.01); *B60L 2240/26* (2013.01); *B60L 2240/46* (2013.01); *B60L 2240/461* (2013.01); *B60L 2240/465* (2013.01); *B60L 2240/647* (2013.01); *B60L 2250/28* (2013.01)

(58) Field of Classification Search
CPC ........ B60L 7/26; B60L 3/108; B60L 2240/10; B60L 2240/16; B60L 2240/26; B60L 2240/46; B60L 2240/461; B60L 2240/465; B60L 2240/647; B60L 2250/28
See application file for complete search history.

(56) References Cited

FOREIGN PATENT DOCUMENTS

| CN | 108099876 B | * | 5/2020 | .............. B60T 8/172 |
| CN | 111824095 A | * | 10/2020 | ................ B60L 7/26 |
| CN | 117584905 A | * | 2/2024 | .......... B60T 8/17551 |
| CN | 117818377 A | * | 4/2024 | ........... B60K 7/0007 |

OTHER PUBLICATIONS

English translation of Li et al. (CN 108099876) (Year: 2020).*
English translation of Xu et al. (CN 111824095) (Year: 2020).*
English translation of Song et al. (CN 117584905) (Year: 2024).*
English translation of Zhang et al. (CN 117818377) (Year: 2024).*

(Continued)

*Primary Examiner* — Kyle J Kingsland
(74) *Attorney, Agent, or Firm* — Hemisphere Law, PLLC; Zhigang Ma

(57) ABSTRACT

A coordinated control method for a regenerative braking system and an anti-lock braking system of a new energy vehicle includes: acquiring real-time data of a vehicle; inputting the real-time data of the vehicle into a prediction model to obtain a required wheel braking torque; and comparing the required wheel braking torque with a maximum braking torque provided by a motor, thereby completing coordinated control between the regenerative braking system and the anti-lock braking system of the vehicle. Under the premise of satisfying functions of both systems, this method aims to recover energy generated during braking as much as possible, thereby improving energy utilization efficiency. This has a positive effect on increasing driving range of the new energy vehicle.

5 Claims, 2 Drawing Sheets

(56) References Cited

OTHER PUBLICATIONS

CNIPA, Notification of a First Office Action for CN202410989477.0, Nov. 13, 2024.
Guangxi University (Applicant), Replacement claims (allowed) of CN202410989477.0, Dec. 5, 2024.
CNIPA, Notification to grant patent right for invention in CN202410989477.0, Dec. 31, 2024.

* cited by examiner

COORDINATED CONTROL METHOD FOR REGENERATIVE BRAKING SYSTEM AND ANTI-LOCK BRAKING SYSTEM OF NEW ENERGY VEHICLE

CROSS-REFERENCE TO RELATED APPLICATION

This application claims priority to Chinese Patent Application No. 202410989477.0, filed Jul. 23, 2024, which is herein incorporated by reference in its entirety.

TECHNICAL FIELD

The disclosure relates to the field of vehicle braking, and more particularly to a coordinated control method for a regenerative braking system and an anti-lock braking system of a new energy vehicle.

BACKGROUND

Coordinated control of an anti-lock braking system (ABS) and a regenerative braking system (RBS) of a vehicle mainly includes four aspects: braking intention recognition, braking force distribution, anti-lock coordinated control, and pressure control. At present, there are two types of braking force distribution algorithms: a superimposed distribution algorithm and a coordinated distribution algorithm. The superimposed distribution algorithm, also known as a parallel distribution algorithm, is mostly used in parallel braking systems. When a new energy vehicle adopts the superimposed distribution algorithm, the regenerative braking system and a hydraulic braking system operate independently, and the coordinated control between a motor and a hydraulic braking force is not possible.

SUMMARY

A purpose of the disclosure is to provide a coordinated control method for a regenerative braking system and an anti-lock braking system of a vehicle. On the premise of ensuring vehicle safety, the coordinated control of the anti-lock braking system and the regenerative braking system is considered by applying two aspects: driving conditions and driver braking intention predictions. This method aims to recover as much energy as possible while ensuring braking safety, thereby increasing driving range of the vehicle.

The technical solution of the disclosure is as follows.

A coordinated control method for a regenerative braking system and an anti-lock braking system of a new energy vehicle, includes:
  acquiring real-time data of a vehicle;
  inputting the real-time data of the vehicle into a prediction model to obtain a required wheel braking torque; and
  comparing the required wheel braking torque with a maximum braking torque provided by a motor, thereby completing coordinated control between the regenerative braking system and the anti-lock braking system of the vehicle.

In an embodiment, the real-time data of the vehicle includes an accelerator pedal signal, a pressure signal and a wheel speed signal of the vehicle.

In an embodiment, the prediction model is a three-degree-of-freedom vehicle dynamics model, including a longitudinal motion of the vehicle, a rotational motion of a front wheel and a rotational motion of a rear wheel as follows:

$$M\dot{v}(k) = 2(F_{x1}(k) + F_{x2}(k))$$

$$\dot{\omega}_1(k) = \frac{R \times F_{x1}(k) - T_{b1}(k)}{J}$$

$$\dot{\omega}_2(k) = \frac{R \times F_{x2}(k) - T_{b2}(k)}{J}$$

where M represents a mass of the vehicle, $\dot{\omega}_1(k)$ represents an acceleration of a front tire, $\dot{\omega}_2(k)$ represents an acceleration of a rear tire, $\dot{v}(k)$ represents a longitudinal acceleration of the vehicle, $F_{x1}(k)$ and $F_{x2}(k)$ respectively represent longitudinal forces acting on the front wheel and the rear wheel, $T_{b1}(k)$ and $T_{b2}(k)$ respectively represent braking torques acting on the front wheel and the rear wheel, k represents a k-th time, R represents a tire radius of the vehicle, and J represents a wheel moment of inertia.

In an embodiment, formulas for the braking torques acting on the front wheel and the rear wheel are respectively as follows:

$$\begin{cases} T_{b1}(k) = T_{b1_h}(k) + T_{b1_m}(k) \\ T_{b2}(k) = T_{b2_h}(k) \end{cases}$$

where $T_{b1_h}(k)$ and $T_{b2_h}(k)$ respectively represent hydraulic braking torques of the front wheel and the rear wheel, and $T_{b1_m}(k)$ represents a braking torque of the motor.

In an embodiment, formulas for the longitudinal forces acting on the front wheel and the rear wheel are respectively as follows:

$$F_{x1}(k) = \mu F_{z1}(k) D \sin\left(C \tan^{-1}\left\{B s_1(k) - E\left[B s_1(k) - \tan^{-1}(B s_1(k))\right]\right\}\right)$$

$$F_{x2}(k) = \mu F_{z2}(k) D \sin\left(C \tan^{-1}\left\{B s_2(k) - E\left[B s_2(k) - \tan^{-1}(B s_2(k))\right]\right\}\right)$$

where B represents a stiffness coefficient, C represents a shape factor, D represents a peak factor, y represents a tire-road friction coefficient, E represents a curvature factor, $F_{z1}(k)$ and $F_{z2}(k)$ respectively represent ground vertical reaction forces acting on the front wheel and the rear wheel, and $s_1(k)$ and $s_2(k)$ respectively represent slip ratios of the front wheel and the rear wheel.

Formulas for the ground vertical reaction forces acting on the front wheel and the rear wheel are respectively as follows:

$$F_{z1}(k) = \frac{Mg}{2L}\left(b + \frac{\dot{v}(k-1)h_g}{g}\right)$$

$$F_{z2}(k) = \frac{Mg}{2L}\left(a - \frac{\dot{v}(k-1)h_g}{g}\right)$$

where a represents a horizontal distance from a center of gravity of the vehicle to a front axle, b represents a horizontal distance from the center of gravity of the vehicle to a rear axle, L represents a distance between the front axle and the rear axle, $h_g$ represents a height from the center of gravity of the vehicle to a ground, g represents a ground gravitational acceleration, and $\dot{v}(k-1)$ represents a longitudinal acceleration of the vehicle at a (k−1)-th time.

In an embodiment, constraints on wheel braking torques, change rates of the wheel braking torques and wheel slip ratios are added when predicting the real-time data of the vehicle, and the constraints are as follows:

$$\begin{cases} T_{b1min} \le T_{b1}(k+i \mid k) \le T_{b1max} \\ T_{b2min} \le T_{b2}(k+i \mid k) \le T_{b2max} \end{cases}$$

$$\begin{cases} \Delta T_{b1min} \le \Delta T_{b1}(k+i \mid k) \le \Delta T_{b1max} \\ \Delta T_{b2min} \le \Delta T_{b2}(k+i \mid k) \le \Delta T_{b2max} \end{cases}$$

$$\begin{cases} s_{min} \le s_1(k+i \mid k) \le s_{max} \\ s_{min} \le s_2(k+i \mid k) \le s_{max} \end{cases}$$

where $T_{b1min}$ and $T_{b2min}$ respectively represent minimum braking torques acting on the front wheel and the rear wheel, and $T_{b1max}$ and $T_{b2max}$ respectively represent maximum braking torques acting on the front wheel and the rear wheel; $\Delta T_{b1min}$ and $\Delta T_{b2min}$ respectively represent minimum adjustment amounts of the braking torques acting on the front wheel and the rear wheel, and $\Delta T_{b1max}$ and $\Delta T_{b2max}$ respectively represent maximum adjustment amounts of the braking torques acting on the front wheel and the rear wheel; $s_{min}$ represents a minimum wheel slip ratio, and $s_{max}$ represents a maximum wheel slip ratio; $T_{b1}(k+i|k)$ represents a predicted braking torque for the front wheel at a (k+i)-th time based on the k-th time, and $T_{b2}$ (k+i|k) represents a predicted braking torque for the rear wheel at the (k+i)-th time based on the k-th time; $\Delta T_{b1}(k+i|k)$ represents a predicted adjustment amount of a braking torque for the front wheel at the (k+i)-th time based on the k-th time, and $\Delta T_{b2}(k+i|k)$ represents a predicted adjustment amount of a braking torque for the rear wheel at the (k+i)-th time based on the k-th time; and $s_1(k+i|k)$ represents a predicted slip ratio for the front wheel at the (k+i)-th time based on the k-th time, and $s_2(k+i|k)$ represents a predicted slip ratio for the rear wheel at the (k+i)-th time based on the (k+i)-th time.

In an embodiment, a formula for the required wheel braking torque is as follows:

$$J_1(k) = J_1\big(u(k \mid k), \ldots, u(k+N_p-1 \mid k)\big)$$

$$= Q_1 \sum_{i=1}^{N_p} \|s_1(k+i \mid k) - s_r\|^2 + R_1 \sum_{i=1}^{N_p-1} \|\Delta T_{b1}(k+i \mid k)\|^2$$

$$J_2(k) = J_2\big(u(k \mid k), \ldots, u(k+N_p-1 \mid k)\big)$$

$$= Q_2 \sum_{i=1}^{N_p} \|s_2(k+i \mid k) - s_r\|^2 + R_2 \sum_{i=1}^{N_p-1} \|\Delta T_{b2}(k+i \mid k)\|^2$$

where (k+i|k) represents a prediction of a parameter at the (k+i)-th time based on the k-th time, $s_r$ represents a predicted slip ratio, $Q_1$ and $Q_2$ respectively represent weight coefficients configured to adjust safety performance of the front wheel and the rear wheel during braking, $R_1$ and $R_2$ respectively represent weight coefficients configured to adjust changes in the braking torques acting on the front wheel and the rear wheel, $J_1(k)$ represents a cost function for the front wheel, $J_2(k)$ represents a cost function for the rear wheel, $N_p$ represents a $N_p$-th time after the k-th time, and u(k|k) represents a generalized function including a slip ratio and an adjusted braking torque.

In an embodiment, the comparing the required wheel braking torque with a maximum braking torque provided by a motor, thereby completing coordinated control between the regenerative braking system and the anti-lock braking system includes:
  in response to the required wheel braking torque being greater than the maximum braking torque provided by the motor, outputting, by the motor, the maximum braking torque, and providing, by a hydraulic braking system, a remaining required braking;
  in response to the required wheel braking torque being less than the maximum braking torque provided by the motor, providing, by the motor, the required wheel braking torque.

Compared to the related art, the disclosure has the following advantages.

The disclosure provides the coordinated control method for the regenerative braking system and the anti-lock braking system of the new energy vehicle. Under the premise of satisfying functions of both systems, this method aims to recover energy generated during braking as much as possible, thereby improving energy utilization efficiency. This has a positive effect on increasing driving range of the new energy vehicle.

BRIEF DESCRIPTION OF DRAWINGS

The drawings are illustrative of various embodiments by way of example rather than limitation, and together with the specification and claims, are intended to describe the embodiments of the disclosure. Where appropriate, the same reference signs are used in all drawings to denote the same or similar parts. Such embodiments are illustrative and are not intended to be exhaustive or exclusive embodiments of the device or method.

DETAILED DESCRIPTION OF EMBODIMENTS

It should be noted that, in the absence of conflict, the embodiments and features thereof in the disclosure may be combined with each other. The following detailed description of the disclosure will be provided with reference to the attached drawings and in conjunction with the embodiments.

Figure 1:
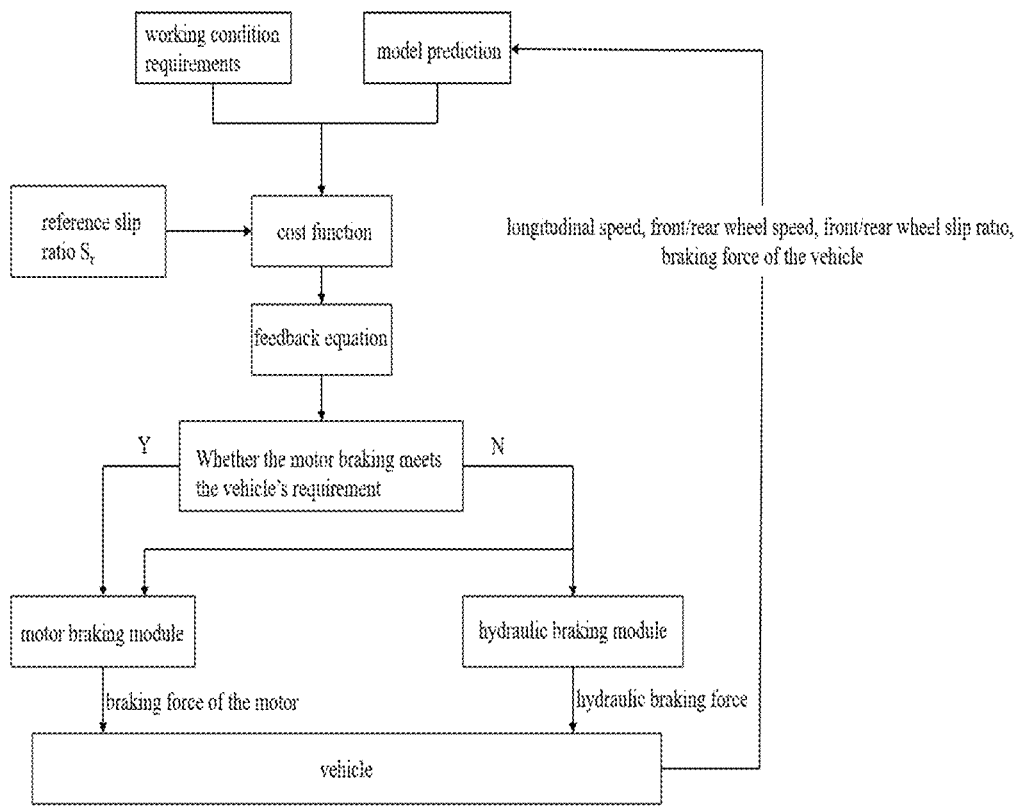
FIG. 1 illustrates a flowchart of a coordinated control method for a regenerative braking system and an anti-lock braking system of a new energy vehicle provided by the disclosure.

An embodiment of the disclosure provides a coordinated control method for a regenerative braking system and an anti-lock braking system of a new energy vehicle. Specific steps are shown in a flowchart of FIG. 1.
Prediction Module A prediction model adopted in the disclosure is a three-degree-of-freedom vehicle dynamics model, which includes a longitudinal motion of a vehicle, a rotational motion of a front wheel and a rotational motion of a rear wheel as follows:

$$M\dot{v}(k) = 2(F_{x1}(k) + F_{x2}(k))$$

$$\dot{\omega}_1(k) = \frac{R \times F_{x1}(k) - T_{b1}(k)}{J}$$

-continued
$$\dot{\omega}_2(k) = \frac{R \times F_{x2}(k) - T_{b2}(k)}{J}$$

where M represents a mass of the vehicle, $\dot{\omega}_1(k)$ represents an acceleration of a front tire, $\dot{\omega}_2(k)$ represents an acceleration of a rear tire, $\dot{v}(k)$ represents a longitudinal acceleration of the vehicle, $F_{x1}(k)$ and $F_{x2}(k)$ respectively represent longitudinal forces acting on the front wheel and the rear wheel, $T_{b1}(k)$ and $T_{b2}(k)$ respectively represent braking torques acting on the front wheel and the rear wheel, k represents a k-th time, R represents a tire radius of the vehicle, and J represents a wheel moment of inertia.

Formulas for the braking torques acting on the front wheel and the rear wheel are respectively as follows:

$$\begin{cases} T_{b1}(k) = T_{b1_h}(k) + T_{b1_m}(k) \\ T_{b2}(k) = T_{b2_h}(k) \end{cases}$$

where $T_{b1_h}(k)$ and $T_{b2_h}(k)$ respectively represent hydraulic braking torques of the front wheel and the rear wheel, $T_{b1_m}(k)$ represents a braking torque of a motor.

Ground braking forces (i.e., the longitudinal forces) acting on the front wheel and the rear wheel can be calculated using a magic formula:

$$F_{x1}(k) = \mu F_{z1}(k) D \sin(C \tan^{-1}\{B s_1(k) - E[B s_1(k) - \tan^{-1}(B s_1(k))]\})$$
$$F_{x2}(k) = \mu F_{z2}(k) D \sin(C \tan^{-1}\{B s_2(k) - E[B s_2(k) - \tan^{-1}(B s_2(k))]\})$$

where B represents a stiffness coefficient, C represents a shape factor, D represents a peak factor, μ represents a tire-road friction coefficient, E represents a curvature factor, $F_{z1}(k)$ and $F_{z2}(k)$ respectively represent ground vertical reaction forces acting on the front wheel and the rear wheel, and $s_1(k)$ and $s_2(k)$ respectively represent slip ratios of the front wheel and the rear wheel.

Formulas for the ground vertical reaction forces acting on the front wheel and the rear wheel are respectively as follows:

$$F_{z1}(k) = \frac{Mg}{2L}\left(b + \frac{\dot{v}(k-1)h_g}{g}\right)$$
$$F_{z2}(k) = \frac{Mg}{2L}\left(a - \frac{\dot{v}(k-1)h_g}{g}\right)$$

where a represents a horizontal distance from a center of gravity of the vehicle to a front axle, b represents a horizontal distance from the center of gravity of the vehicle to a rear axle, L represents a distance between the front axle and rear axle, $h_g$ represents a height from the center of gravity of the vehicle to a ground, g represents a ground gravitational acceleration, and $\dot{v}(k-1)$ represents a longitudinal acceleration of the vehicle at a (k-1)-th time.

A relationship between a current state and a future state of a wheel slip ratio can be expressed through the prediction model.

A longitudinal speed of the vehicle and angular speeds of the front tire and the rear tire at the k-th time can be used to determine a longitudinal speed of the vehicle and angular speeds of the front tire and the rear tire at a (k+1)-th time:

$$v(k+1) = v(k) + \dot{v}(k)T_s$$
$$\omega_1(k+1) = \omega_1(k) + \dot{\omega}_1(k)T_s$$
$$\omega_2(k+1) = \omega_2(k) + \dot{\omega}_2(k)T_s$$

where $T_s$ represents a sampling period of the vehicle; v(k) represents the longitudinal speed of the vehicle at the k-th time, and v(k+1) represents the longitudinal speed of the vehicle at the (k+1)-th time; $\omega_1(k)$ represents the angular speed of the front tire at the k-th time, and $\omega_1(k+1)$ represents the angular speed of the front tire at the (k+1) time; and $\omega_2(k)$ represents the angular speed of the rear tire at the k-th time, and $\omega_2(k+1)$ represents the angular speed of the rear tire at the (k+1) time.

A formula for the wheel slip ratio at the future (k+1)-th time is as follows:

$$s_1(k+1) = \left[\frac{\omega_1(k+1) \times R}{v^2(k+1)} \quad \frac{-R}{v(k+1)}\right] \times \left[\begin{array}{c} \Delta v + 1 \\ \Delta \omega_1 k + 1 \end{array}\right] + s_1(k)$$

$$s_2(k+1) = \left[\frac{\omega_2(k+1) \times R}{v^2(k+1)} \quad \frac{-R}{v(k+1)}\right] \times \left[\begin{array}{c} \Delta v + 1 \\ \Delta \omega_2 k + 1 \end{array}\right] + s_2(k)$$

where Δv represents a change of a driving speed (i.e., the longitudinal speed) of the vehicle, and $\Delta\omega_1$ and $\Delta\omega_2$ respectively represent changes of rotational speeds (i.e., the angular speeds) of the front tire and the rear tire.

This process the model prediction of the vehicle, where v(k), $\omega_1(k)$, $\omega_2(k)$, $s_1(k)$, $s_2(k)$, $T_{b1}(k)$, $T_{b2}(k)$, $F_{x1}(k)$ and $F_{x2}(k)$ represent actual data obtained from the vehicle at a previous time and are transmitted to the prediction model, and then predicted values are obtained: $s_1(k+1)$, $s_2(k+1)$, v(k+1), $\omega_1(k+1)$ and $\omega_2(k+1)$.

Working Condition Requirements

Cost functions for a next step of the disclosure are mainly constrained by wheel braking torques, change rates of the wheel braking torques and wheel slip ratios. The constraints are as follows:

$$\begin{cases} T_{b1min} \leq T_{b1}(k+i|k) \leq T_{b1max} \\ T_{b2min} \leq T_{b2}(k+i|k) \leq T_{b2max} \end{cases}$$

$$\begin{cases} \Delta T_{b1min} \leq \Delta T_{b1}(k+i|k) \leq \Delta T_{b1max} \\ \Delta T_{b2min} \leq \Delta T_{b2}(k+i|k) \leq \Delta T_{b2max} \end{cases}$$

$$\begin{cases} s_{min} \leq s_1(k+i|k) \leq s_{max} \\ s_{min} \leq s_2(k+i|k) \leq s_{max} \end{cases}$$

where $T_{b1min}$ and $T_{b2min}$ respectively represent minimum braking torques acting on the front wheel and the rear wheel, and $T_{b1max}$ and $T_{b2max}$ respectively represent maximum braking torques acting on the front wheel and the rear wheel; $\Delta T_{b1min}$ and $\Delta T_{b2min}$ respectively represent minimum adjustment amounts of the braking torques acting on the front wheel and the rear wheel, and $\Delta T_{b1max}$ and $\Delta T_{b2max}$ respectively represent maximum adjustment amounts of the braking torques acting on the front wheel and the rear wheel; $s_{min}$ represents a minimum wheel slip ratio, and $s_{max}$ represents a maximum wheel slip ratio; $T_{b1}(k+i|k)$ represents a predicted braking torque for the front wheel at the (k+i)-th time based on the k-th time, and $T_{b2}(k+i|k)$ represents a predicted braking torque for the rear wheel at the (k+i)-th time based on the k-th time; $\Delta T_{b1}(k+i|k)$ represents a predicted adjustment amount of a braking torque for the front wheel at the (k+i)-th time based on the k-th time, and $\Delta T_{b2}(k+i|k)$ represents a predicted adjustment amount of a braking torque for the rear wheel at the (k+i)-th time based on the k-th time; and $s_1(k+i|k)$ represents a predicted slip ratio for the front wheel at the (k+i)-th time based on the k-th time, and $s_2(k+i|k)$ represents a predicted slip ratio for the rear wheel at the (k+i)-th time based on the (k+i)-th time.

Cost Functions

Based on the current state of the vehicle, wheel slip states over next $N_p$ sampling time intervals can be inferred using the model prediction. To control the wheel slip ratio at a desired value in order to fully utilize road surface conditions for braking, it is necessary to determine a braking torque required by a corresponding wheel. Since an optimal slip ratio for most road surfaces is around 0.2, a desired slip ratio (i.e., a reference slip ratio) is set at 0.2 to ensure that the anti-lock braking system maintains superior braking performance on various road surfaces. By minimizing the cost functions, optimal adjustment amounts $\Delta T_{b1n}$ and $\Delta T_{b2}$ of the braking torques acting on the front wheel and the rear wheel in a next sampling period are obtained. Corresponding changes of the braking torques are applied to wheels to quickly bring the slip ratios of the front wheel and the rear wheel to the desired value during a braking process of the anti-lock braking system. In addition, the cost functions take into account the impact of the braking torques on the wheels to minimize its influence. Thus, the cost functions can be formulated as follows:

$$J_1(k) = J_1(u(k|k), \ldots, u(k+N_p-1|k))$$

$$= Q_1 \sum_{i=1}^{N_p} \|s_1(k+i|k) - s_r\|^2 + R_1 \sum_{i=1}^{N_p-1} \|\Delta T_{b1}(k+i|k)\|^2$$

$$J_2(k) = J_2(u(k|k), \ldots, u(k+N_p-1|k))$$

$$= Q_2 \sum_{i=1}^{N_p} \|s_2(k+i|k) - s_r\|^2 + R_2 \sum_{i=1}^{N_p-1} \|\Delta T_{b2}(k+i|k)\|^2$$

where (k+i|k) represents a prediction of a parameter at the (k+i)-th time based on the k-th time, $s_r$ represents a predicted slip ratio, $Q_1$ and $Q_2$ respectively represent weight coefficients configured to adjust safety performance of the front wheel and rear wheel during braking, $R_1$ and $R_2$ respectively represent weight coefficients configured to adjust changes in the braking torques acting on the front wheel and the rear wheel; $J_1(k)$ represents a cost function for the front wheel, $J_2(k)$ represents a cost function for the rear wheel, $N_p$ represents a $N_p$-th time after the k-th time, and $u(k|k)$ represents a generalized function including a slip ratio and an adjusted braking torque.

Feedback Equations

Through the minimum cost functions $J_1(k)$ and $J_2(k)$, an optimal sequence of control variables for a braking torque adjustment amount can be obtained. A first element of the optimal sequence is then used as a required braking torque adjustment amount for a wheel in the feedback equations. Thus, it can be formulated as follows:

$$\begin{cases} T_{b1}(k+1) = T_{b1}(k) + \Delta T_{b1}(k+1) \\ T_{b2}(k+1) = T_{b2}(k) + \Delta T_{b2}(k+1) \end{cases}$$

To enhance the braking performance and stability of the vehicle, the disclosure employs a braking control strategy based on independent control of two front wheels and low-select control of two rear wheels. A current state of each front wheel is used to calculate a corresponding braking torque adjustment amount for a next state, thereby maintaining slip ratios of the two front wheels near the desired value and improving braking performance. Braking torque adjustment amounts for the two rear wheels are calculated based on a state of a rear wheel with a lower rotational speed between the two rear wheels, and a same braking torque is applied to the two rear wheels. This prevents vehicle instability during braking caused by unequal ground braking forces between left and right rear wheels. To coordinate the regenerative braking system and the anti-lock braking system to control the wheel slip ratio, a required wheel braking torque is compared with a maximum braking torque provided by the motor. If the required wheel braking torque is greater than the maximum braking torque provided by the motor, the motor outputs its maximum braking torque, and a remaining required braking torque is provided by a hydraulic braking system. If the required wheel braking torque is less than the maximum braking torque provided by the motor, the motor provides the required wheel braking torque.

Furthermore, as shown in the flowchart, the predicted braking torques for the front wheel and the rear wheel are obtained through the feedback equations. If the required wheel braking torque is greater than the maximum braking torque provided by the motor, the motor outputs its maximum braking torque, and the remaining required wheel braking torque is provided by the hydraulic braking system. Conversely, if the required wheel braking torque is less than the maximum braking torque provided by the motor, the motor provides the required wheel braking torque.

Figure 2:
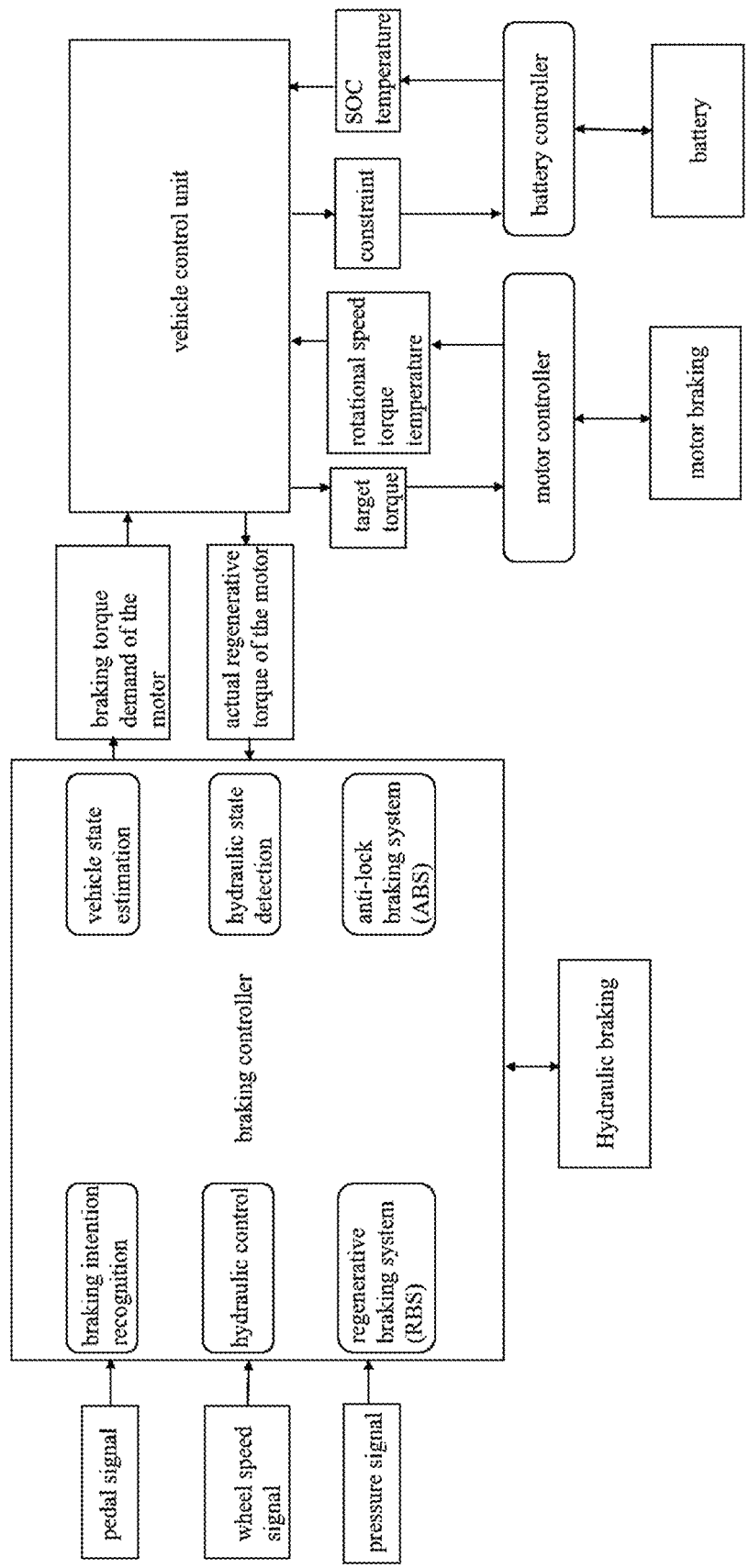
FIG. 2 illustrates a schematic diagram of a layout structure of controllers provided by the disclosure.

From FIG. 2, it can be seen that it is a diagram of a layout structure of controllers between the regenerative braking system and the anti-lock braking system of the vehicle. As shown in FIG. 2, the vehicle acquires the accelerator pedal signal, the pressure signal and the wheel speed signal of the vehicle through sensors and transmits these signals to a braking controller. The braking controller includes functional modules for braking intention recognition, hydraulic control, regenerative braking system, vehicle state estimation, hydraulic state detection, and anti-lock braking system. By predicting a braking force for a next time, the braking controller sends a braking torque demand of the motor to a vehicle control unit via controller area network (CAN) communication. The vehicle control unit then transmits a target torque and constraint signals to a motor controller and a battery controller, respectively, to control the motor and the battery. Subsequently, the motor controller and the battery controller send signals such as speed, torque, and state of charge (SOC) temperature back to the vehicle control unit. The vehicle control unit then feeds back an actual regenerative torque of the motor to the braking controller. If the motor braking is insufficient to meet the braking demand, the hydraulic braking is triggered, Therefore, the coordination control between the regenerative braking system and the anti-lock braking system of the vehicle is completed.

The above description is merely a specific implementation of the disclosure. However, the scope of protection of the disclosure is not limited to this. Those skilled in the art can make equivalent substitutions or modifications within the technical scope disclosed by the disclosure, based on the technical solution and inventive concept of the disclosure, and these should all be covered within the scope of protection of the disclosure.

What is claimed is:

1. A coordinated control method for a regenerative braking system and an anti-lock braking system of a new energy vehicle, comprising:
   acquiring real-time data of a vehicle;
   inputting the real-time data of the vehicle into a prediction model to obtain a required wheel braking torque; and
   comparing the required wheel braking torque with a maximum braking torque provided by a motor, thereby completing coordinated control between the regenerative braking system and the anti-lock braking system of the vehicle; and
   wherein constraints on wheel braking torques, change rates of the wheel braking torques and wheel slip ratios are added when predicting the real-time data of the vehicle, and the constraints are as follows:

$$\begin{cases} T_{b1min} \leq T_{b1}(k+i\,|\,k) \leq T_{b1max} \\ T_{b2min} \leq T_{b2}(k+i\,|\,k) \leq T_{b2max} \end{cases}$$

$$\begin{cases} \Delta T_{b1min} \leq \Delta T_{b1}(k+i\,|\,k) \leq \Delta T_{b1max} \\ \Delta T_{b2min} \leq \Delta T_{b2}(k+i\,|\,k) \leq \Delta T_{b2max} \end{cases}$$

$$\begin{cases} s_{min} \leq s_1(k+i\,|\,k) \leq s_{max} \\ s_{min} \leq s_2(k+i\,|\,k) \leq s_{max} \end{cases}$$

where $T_{b1min}$ and $T_{b2min}$ respectively represent minimum braking torques acting on a front wheel and a rear wheel, and $T_{b1max}$ and $T_{b2max}$ respectively represent maximum braking torques acting on the front wheel and the rear wheel; $\Delta T_{b1min}$ and $\Delta T_{b2min}$ respectively represent minimum adjustment amounts of braking torques acting on the front wheel and the rear wheel, and $\Delta T_{b1max}$ and $\Delta T_{b2max}$ respectively represent maximum adjustment amounts of the braking torques acting on the front wheel and the rear wheel; $s_{min}$ represents a minimum wheel slip ratio, and $s_{max}$ represents a maximum wheel slip ratio; $T_{b1}(k+i|k)$ represents a predicted braking torque for the front wheel at a (k+i)-th time based on a k-th time, and $T_{b2}(k+i|k)$ represents a predicted braking torque for the rear wheel at the (k+i)-th time based on the k-th time; $\Delta T_{b1}(k+i|k)$ represents a predicted adjustment amount of a braking torque for the front wheel at the (k+i)-th time based on the k-th time, and $\Delta T_{b2}(k+i|k)$ represents a predicted adjustment amount of a braking torque for the rear wheel at the (k+i)-th time based on the k-th time; and $s_1(k+i|k)$ represents a predicted slip ratio for the front wheel at the (k+i)-th time based on the k-th time, and $s_2(k+i|k)$ represents a predicted slip ratio for the rear wheel at the (k+i)-th time based on the (k+i)-th time;
wherein a formula for the required wheel braking torque is as follows:

$$J_1(k) = J_1(u(k\,|\,k), \ldots, u(k+N_p-1\,|\,k))$$

$$= Q_1 \sum_{i=1}^{N_p} \|s_1(k+i\,|\,k) - s_r\|^2 + R_1 \sum_{i=1}^{N_p-1} \|\Delta T_{b1}(k+i\,|\,k)\|^2$$

-continued
$$J_2(k) = J_2(u(k\,|\,k), \ldots, u(k+N_p-1\,|\,k))$$

$$= Q_2 \sum_{i=1}^{N_p} \|s_2(k+i\,|\,k) - s_r\|^2 + R_2 \sum_{i=1}^{N_p-1} \|\Delta T_{b2}(k+i\,|\,k)\|^2$$

where (k+i|k) represents a prediction of a parameter at the (k+i)-th time based on the k-th time, $s_r$ represents a predicted slip ratio, $Q_1$ and $Q_2$ respectively represent weight coefficients configured to adjust safety performance of the front wheel and the rear wheel during braking, $R_1$ and $R_2$ respectively represent weight coefficients configured to adjust changes in the braking torques acting on the front wheel and the rear wheel, $J_1(k)$ represents a cost function for the front wheel, $J_2(k)$ represents a cost function for the rear wheel, $N_p$ represents a $N_p$-th time after the k-th time, and u(k|k) represents a generalized function comprising a slip ratio and an adjusted braking torque;
wherein, in response to the required wheel braking torque being greater than the maximum braking torque provided by the motor, outputting, by the motor, the maximum braking torque, and providing, by a hydraulic braking system, a remaining required braking torque;
in response to the required wheel braking torque being less than the maximum braking torque provided by the motor, providing, by the motor, the required wheel braking torque.

2. The coordinated control method for the regenerative braking system and the anti-lock braking system of the new energy vehicle as claimed in claim 1, wherein the real-time data of the vehicle comprises an accelerator pedal signal, a pressure signal and a wheel speed signal of the vehicle.

3. The coordinated control method for the regenerative braking system and the anti-lock braking system of the new energy vehicle as claimed in claim 1, wherein the prediction model is a three-degree-of-freedom vehicle dynamics model, comprising a longitudinal motion of the vehicle, a rotational motion of the front wheel and a rotational motion of the rear wheel as follows:

$$M\dot{v}(k) = 2(F_{x1}(k) + F_{x2}(k))$$

$$\dot{\omega}_1(k) = \frac{R \times F_{x1}(k) - T_{b1}(k)}{J}$$

$$\dot{\omega}_2(k) = \frac{R \times F_{x2}(k) - T_{b2}(k)}{J}$$

where M represents a mass of the vehicle, $\dot{\omega}_1(k)$ represents an acceleration of a front tire, $\dot{\omega}_2(k)$ represents an acceleration of a rear tire, $\dot{v}(k)$ represents a longitudinal acceleration of the vehicle, $F_{x1}(k)$ and $F_{x2}(k)$ respectively represent longitudinal forces acting on the front wheel and the rear wheel, $T_{b1}(k)$ and $T_{b2}(k)$ respectively represent the braking torques acting on the front wheel and the rear wheel, k represents the k-th time, R represents a tire radius of the vehicle, and J represents a wheel moment of inertia.

4. The coordinated control method for the regenerative braking system and the anti-lock braking system of the new energy vehicle as claimed in claim 3, wherein formulas for the braking torques acting on the front wheel and the rear wheel are respectively as follows:

$$\begin{cases} T_{b1}(k) = T_{b1_h}(k) + T_{b1_m}(k) \\ T_{b2}(k) = T_{b2_h}(k) \end{cases}$$

where $T_{b1_h}(k)$ and $T_{b2_h}(k)$ respectively represent hydraulic braking torques of the front wheel and the rear wheel, and $T_{b1_m}(k)$ represents a braking torque of the motor.

5. The coordinated control method for the regenerative braking system and the anti-lock braking system of the new energy vehicle as claimed in claim 4, wherein formulas for the longitudinal forces acting on the front wheel and the rear wheel are respectively as follows:

$$F_{x1}(k) = \mu F_{z1}(k) \, D\sin(C\tan^{-1}\{Bs_1(k) - E[Bs_1(k) - \tan^{-1}(Bs_1(k))]\})$$

$$F_{x2}(k) = \mu F_{z2}(k) \, D\sin(C\tan^{-1}\{Bs_2(k) - E[Bs_2(k) - \tan^{-1}(Bs_2(k))]\})$$

where B represents a stiffness coefficient, C represents a shape factor, D represents a peak factor, μ represents a tire-road friction coefficient, E represents a curvature factor, $F_{z1}(k)$ and $F_{z2}(k)$ respectively represent ground vertical reaction forces acting on the front wheel and the rear wheel, and $s_1(k)$ and $s_2(k)$ respectively represent slip ratios of the front wheel and the rear wheel;

wherein formulas for the ground vertical reaction forces acting on the front wheel and the rear wheel are respectively as follows:

$$F_{z1}(k) = \frac{Mg}{2L}\left(b + \frac{\dot{v}(k-1)h_g}{g}\right)$$

$$F_{z2}(k) = \frac{Mg}{2L}\left(b + \frac{\dot{v}(k-1)h_g}{g}\right)$$

where a represents a horizontal distance from a center of gravity of the vehicle to a front axle, b represents a horizontal distance from the center of gravity of the vehicle to a rear axle, L represents a distance between the front axle and the rear axle, $h_g$ represents a height from the center of gravity of the vehicle to a ground, g represents a ground gravitational acceleration, and $\dot{v}(k-1)$ represents a longitudinal acceleration of the vehicle at a (k−1)-th time.

\* \* \* \* \*